March 10, 1964     C. M. CERVIN     3,123,852
CONTROL APPARATUS

Filed Aug. 8, 1960     2 Sheets-Sheet 1

INVENTOR
CURTIS M. CERVIN
BY *Gordon Reed*
ATTORNEY

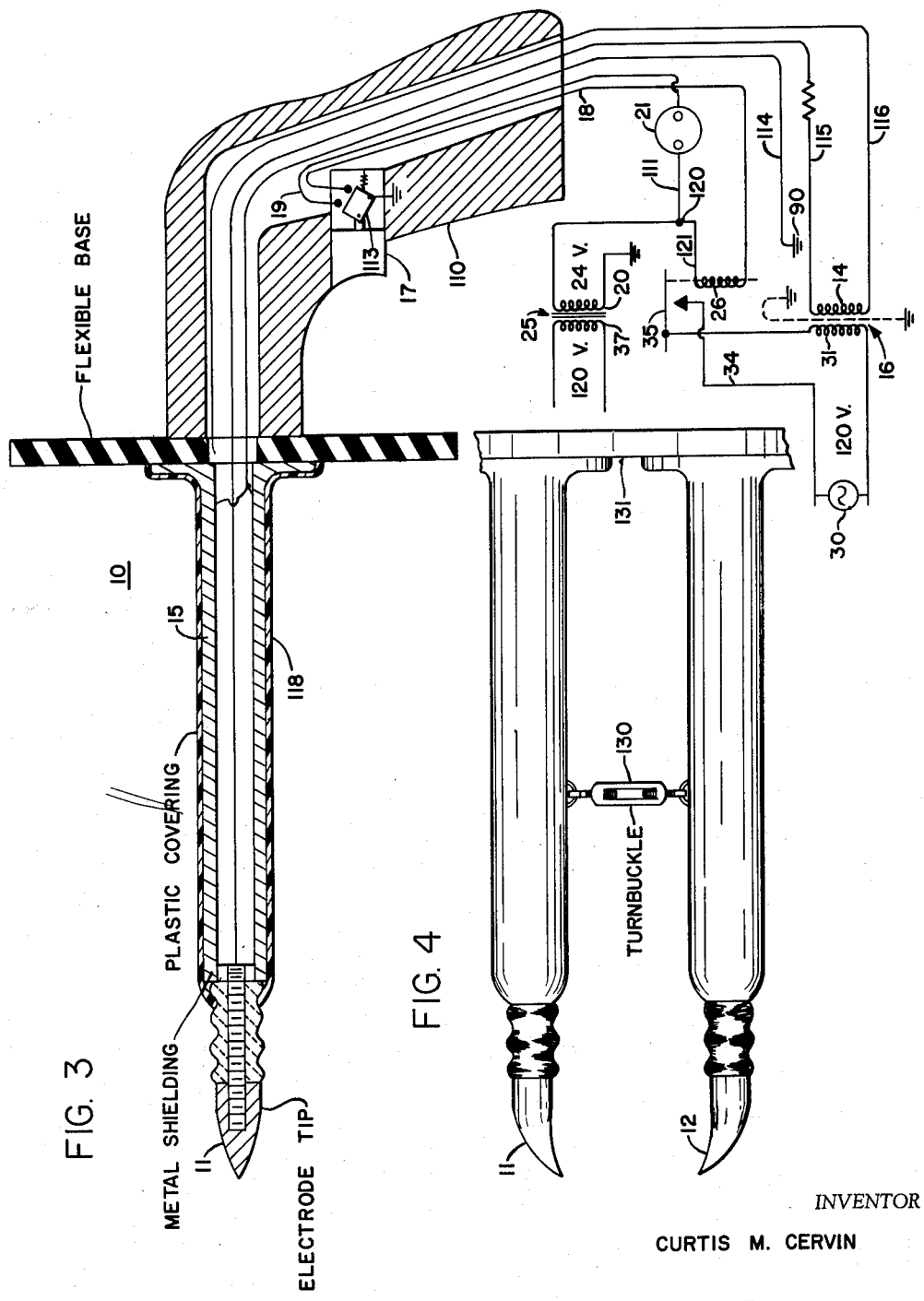

United States Patent Office 3,123,852
Patented Mar. 10, 1964

3,123,852
CONTROL APPARATUS
Curtis M. Cervin, 5253 Xerxes Ave. S.,
Minneapolis, Minn.
Filed Aug. 8, 1960, Ser. No. 48,107
11 Claims. (Cl. 17—1)

This invention relates to electrical stunning apparatus for stunning cattle and other livestock animals before the actual act of slaughtering or bleeding such animals. The invention relates primarily to novel stunning apparatus utilizing a high voltage during the stunning operation whereby to render the animal unconscious without having material or substantial effect on the heart action of the animal a sufficient period of time during which slaughtering or bleeding is effected.

While devices for electrically stunning animals, such as that disclosed in U.S. Patent 2,002,755, have been heretofore utilized, such devices required considerable manipulation by the operator, particularly regarding the spacing of the two electrodes which are brought into contact with the animal to be stunned.

An object of this invention is to provide a novel stunning apparatus comprising a gun having elongated electrodes set at a selected spacing during the stunning of a number of animals having similar physical characteristics.

A further object of this invention is to provide a novel stunning gun having spaced electrodes which may be adjusted to any of a plurality of selected spacings and retained therein subsequently for stunning a number of animals in sequence having similar physical characteristics.

A further object of this invention is to provide a monitoring or safety control for said stunning gun to protect the operator against mishap in the event of malfunction in the electrical circuit for said gun or other portions of the apparatus.

A further object of this invention is to provide a monitoring or safety control for said stunning gun which renders the gun ineffective during a malfunction in the configuration of the gun, while said gun may be rendered effective on removal of said malfunction.

A further object of this invention is to provide a monitoring or safety control for said stunning gun which renders either or both electrodes of the gun electrically ineffective during a malfunction in the configuration of the gun, while said gun may be rendered effective on removal of said malfunction.

The above and other objects and advantages of the invention will appear more fully hereinafter from a consideration of the detailed description which follows when taken together with the accompanying drawings illustrating one embodiment of the invention and modifications thereof.

In the drawing:

FIGURE 3 is a sectional view of the gun and illustrates the gun electrode and manual switch in greater detail; and FIGURE 4 is a partial view at 90° to FIGURE 3 of the gun.

The stunning apparatus comprises a stunning gun which takes its name from the construction of the part thereof grasped by the operator in one hand while applying electrodes to the head of the animal to be stunned. Preferably the part thus grasped resembles the grip of an automatic revolver, although somewhat enlarged. The gun includes a manually operable switch which is closed slightly prior to engaging the electrodes with the head of the animal to be stunned, whereby a current due to a high voltage passes through the brain of the animal causing stunning without materially affecting the heart action for a period of time during which slaughtering or bleeding may be performed, thereby continuing the unconscious condition until death.

The high voltage circuit which energizes the electrodes could become defective such as shorting to ground from one electrode. This could result in injury or death to the operator or animal in the event that the manual switch were closed while but one electrode was in electrical contact with the animal that in turn was in contact with ground. A safety control circuit is provided which renders the manual switch ineffective to apply the high voltage to the gun electrodes in this event. This safety control circuit is effective prior to the closing of the manual switch but is rendered temporarily ineffective while the manual switch is effective to energize the electrodes. In the event a malfunction occurs that renders the manual switch ineffective, the switch may be thereafter rendered effective upon removal of the malfunction, by a reset circuit.

Figure 1:
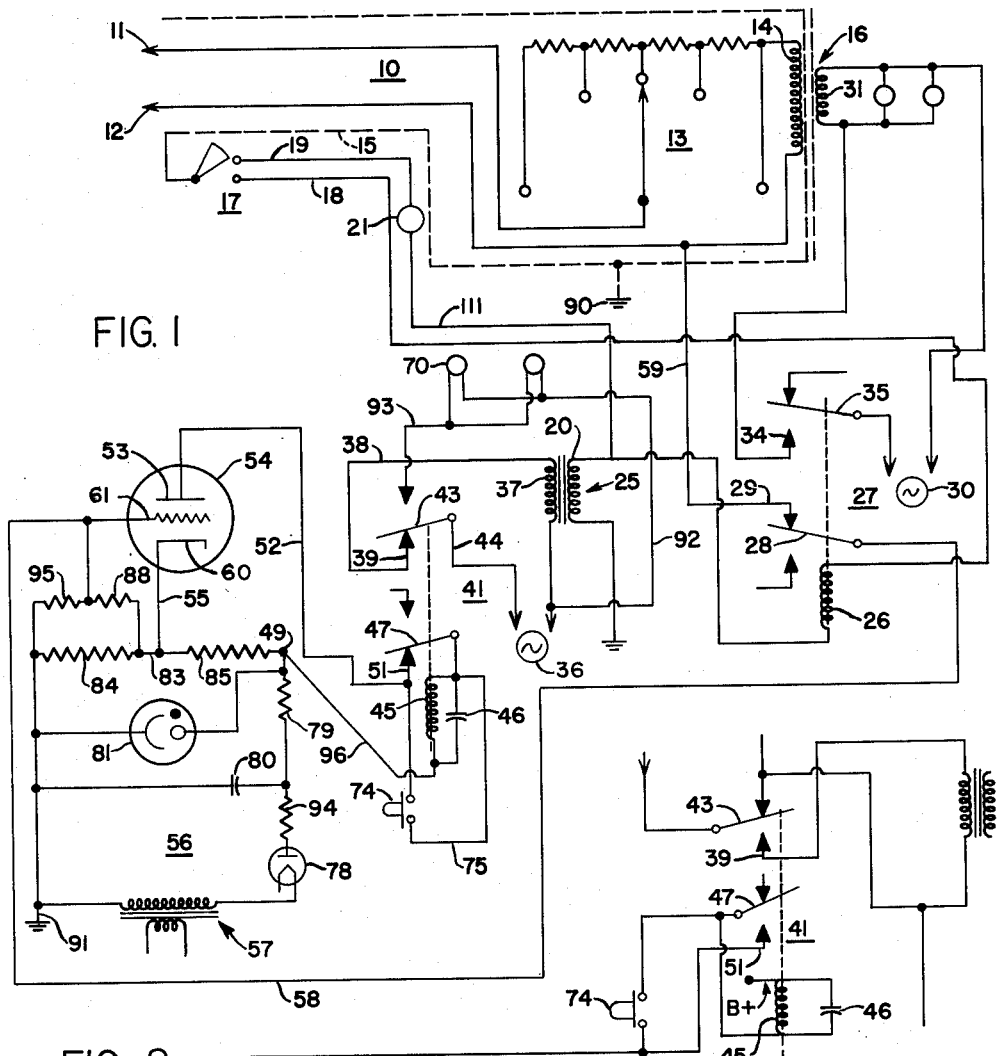
FIGURE 1 is a schematic of the electrical stunning apparatus including a gun with safety control provisions.

Referring to FIGURE 1 and considering firstly the stunning circuit, animals are stunned by applying electrodes 11, 12 constituting part of a "gun" 10 to the head of an animal to be stunned shortly after energizing the electrodes, thereby completing a circuit through the brain of the animal across electrodes 11 and 12. Electrode 11 is connected through a variable resistance 13 to one side of a secondary winding 14 of a voltage step-up transformer 16. Electrode 12 is directly connected to the opposite end of the secondary winding 14. The secondary winding 14 is included in a circuit that is energized by closing a manual double contact sector switch 17 among other things, the switch 17 having the contactor side connected through electrode wiring shielding means 15 on the gun to ground and having one contact connected through conductor 19, a load device 21 such as an electrically operable animal restraint, conductor 111, a secondary winding 20 of a second transformer 25, and thence to ground. The animal restraint may be similar to that in Hlavacek et al. 3,055,046 having a solenoid 86 FIG. 5 energized by an electric current in the manner applied to load device 21 herein. A second contact has extending therefrom conductor 18 extending to an operating winding 26 of a two-pole double-throw relay 27, secondary winding 20 of transformer 25 to ground. Shielding 15 may serve as a structural support for electrodes 11, 12. With the secondary winding 20 of transformer 25 energized by means to be described, closed sector switch 17 initially energizes load device 21 and further movement of the switch contactor while still energizing device 21 also closes a circuit through relay winding 26, thereby causing relay 27 to pull in. Operation of relay 27 completes a circuit from one side of a 120 volt A.C. supply 30 to the upper end of primary winding 31 of transformer 16, through the winding 31, and from the lower end of the winding through "in" contact 34 of relay 27, and operable arm 35 to the opposite side of the A.C. supply 30. With the primary winding 31 of transformer 16 energized, a voltage appears across electrodes 11 and 12 and the current output through the load may be selectively adjusted by the variable resistor 13.

*Safety Control Circuit*

The "gun" 10 which comprises electrodes 11, 12 and manually operable switch 17 is provided with a fail-safe circuit which renders the manually operable switch 17 ineffective in the event that either electrode 11 or 12, elements of the circuit energized by winding 14, should be grounded to the shielding or conductor 15 of the gun or any other conductor slightly above ground. For example, without the safety circuit, and assuming an undesired or fault ground of electrode 12, then if switch 17 were closed with only electrode 11 engaging the animal a circuit from electrode 11 passes through the animal if it too were grounded through the fault ground of electrode 12 to the secondary 14, thereby killing the animal. The safety circuit or fail-safe circuit is associated with the primary winding 37 of transformer 25 and functions to prevent the energization of secondary winding 20 of transformer 25 so that on closing of switch 17 the operating winding 26 of relay 27 is not energized. In effect, upon occurrence of a ground between either electrode 11, 12 and shielding or conductor 15 the circuit of the primary winding 37 of transformer 25 is opened.

The circuit through the primary winding 37 of transformer 25 extends from an A.C. supply 36 through the primary winding 37, conductor 38, relay "in" contact 39 of a double-pole double-throw relay 41, operated relay arm 43, conductor 44, to the other side of the 120 A.C. voltage supply. Normally, the operating winding 45 of relay 41 is energized to maintain as shown the relay arms 43, 47 in the down or operated positions in the figure.

The circuit for the operating winding 45 extends from a source of B+ voltage 56, conductor 96, winding 45, relay arm 47, relay "in" contact 51, conductor 52, the plate 53 of a vacuum tube amplifier 54, the amplifier cathode 60, cathode conductor 55, conductor 83, voltage dividing resistor 85, to terminal 49 of supply 56. The current through vacuum tube 54 is ordinarily sufficient to maintain winding 45 energized and thus maintain relay arms 43, 47 in their operated positions. Relay winding 45 is shunted by a capacitor 46, to prevent transient relay de-energization.

A monitoring circuit that de-energizes winding 45 extends from the control grid 61 of amplifier 54, conductor 58, operable relay arm 28 of relay 27, relay "out" contact 29, conductor 59, to one end of the secondary winding 14 of transformer 16. In the event of a short circuit by the electrodes 11, 12 and shielding means 15 to ground 90, and ground 91 of power supply 56, the current through amplifier tube 54 is reduced, since the grid voltage is reduced, resulting in reduction in the current through relay operating winding 45 of relay 41. This decrease in current causes relay arms 43 and 47 to return to the unoperated or up positions in the figure.

Relay arm 43 at this time completes a circuit through a fault-indication lamp 70 from one side of the 120 volt power source, conductor 92 through the lamp, conductor 93, relay arm 43, conductor 44 to the opposite terminal of the power source. The relay arm 43 also opens the circuit through the primary winding 37 of the transformer 25 rendering the "gun" 10 inoperative.

If the "fault" or malfunction has been corrected and thus the current removed between either electrodes 11 or 12 and shielding means or conductor 15 or conductor 18, the circuit through relay winding 45 is "reset." Resetting is done by operating a manual reset switch 74 which completes a circuit from B+ supply 56, relay winding 45, conductor 75, switch 74, relay "in" contact 51, conductor 52, thence to amplifier 54. With relay winding 45 energized, a holding circuit for the winding is completed between operated relay arm 47 and "in" contact 51. Thus switch 74 may be a normally open—momentarily closed spring biased switch.

In the present ararngement, B+ voltage is obtained from power supply arrangement 56 comprising a transformer 57. One end of a secondary winding of transformer 57 is connected through a diode 78, resistor 94, resistor 79, resistor 85, conductor 83, resistor 84 to the opposite end of the secondary winding which end is also connected to ground. A filter condenser 80 and a voltage regulator tube 81 are connected between ground and the positive side of the power supply 56 to which conductor 49 is connected. The arrangement is such that B+ voltage appears at terminal conductor 49 which is intermediate series connected resistors 79, 85. For grid control purposes, resistor 84 is shunted by two resistors 88, 95 connected in series and the junction of these series resistors is connected to the control grid of amplifier 54. Extending as stated from the control grid is a conductor 58 connecting with relay arm 28, contact 29, conductor 59, winding 14, shielding 15, electrodes 11, 12 for the purpose previously described.

Figure 2:
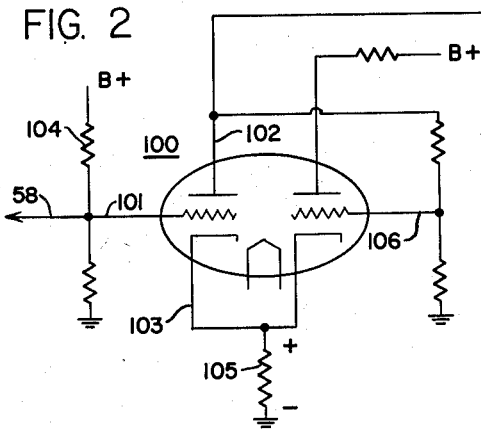
FIGURE 2 is a modification of the safety control circuit of the gun.

FIGURE 2 shows a multi-vibrator or bi-stable device 100 that may be substituted for amplifier 54 in the monitoring circuit. Multi-vibrator 100 includes a control grid 101, a plate 102, and cathode 103. The control voltage on grid 101 is derived from a source of voltage applied across a voltage dividing resistor 104. Conductor 58 extends from an intermediate point on the voltage dividing resistor 104 and is connected to relay arm 28 as in the arrangement of FIGURE 1. The relay 41 and reset switch 74 are similarly connected as in FIGURE 1. Multi-vibrator 100 is preferred to the amplifier 54 because of its sharp on-off characteristics, conventional in such bi-stable devices. The sharp cut-off is accelerated by the voltage drop across common cathode resistor 105 and the reverse action of grid 106 caused by the cross connection between plate 102 and grid 106 during conduction through load or winding 45. Such sharp cut-off or instantaneous action is desired in the monitor device.

Coming now to FIGURE 3 which shows in cross section the gun 10, the gun 10 comprises the butt or handle 110 grasped by the operator. Extending into the lower end of the handle 110 are five conductors or wires. Two of these wires 19, 18 are associated with a manually operable contactor 113 of the manually operable switch 17. The remaining wires 114, 115, 116 are associated with the electrodes 11, 12 and shielding 15. Wire 114 as shown is connected to diametrically opposite portions of shielding means 15 or ground connection of both electrodes 11 and 12. Wires 115 and 116 are connected to electrodes 11 and 12. The shielding 15 is encased by a non-conducting material such as plastic covering 118.

The switch contact 113 is so arranged and constructed that as it pivots in response to manual operation as when squeezing the trigger on a gun, it engages initially the terminal of wire 118 and on further displacement engages the terminal of wire 119 at which time both terminals are simultaneously engaged.

Wire 111 extends to an upper end of transformer winding 20 which has its lower end connected to ground. Wire 111 also extends from the upper end of winding 20 to load device 21, and conductor 19 extends therefrom to the second engaged contact of switch 17 which thus controls the energization of load device 21 and relay winding 26. Winding 26 serves to actuate the arm 35 to complete a circuit through primary winding 31. Transformer winding 31 energizes the secondary winding 14 to apply a high voltage in excess of 300 volts across the electrodes 11, 12.

FIGURE 4 is a partial view of FIGURE 3 rotated 90° and showing the turnbuckle 130 between the electrode supports whereby the electrodes 11, 12 may have the spacing therebetween adjusted. The electrode supports are such as to permit various lateral spacing. Thus the electrodes may be mounted in a flexible base 131 to permit such adjustment. The electrodes 11, 12 as shown are slightly toed in to make contact approximately normal to the animal being stunned, to thus readily pass through the hair of the animal and engage the flesh directly with the electrode point.

It will now be apparent that there has been provided a stunning gun which initially operates a restraint on the animal and concurrently utilizes a high voltage for stunning purposes and includes a novel monitoring arrangement to safeguard against injury both the person of the operator of the gun and the animal. Injury to the animal would be such as to cause fibrulations of the heart which would interfere with proper bleeding of the animal. While a preferred embodiment thereof has been disclosed, the invention is not limited to the precise details shown, but is limited by the following claims.

What is claimed is:

1. In electrical stunning apparatus, a pair of spaced electrodes, means comprising a voltage transformer winding for energizing said electrodes, connecting means coupling said electrodes and transformer winding, further means associated with said winding and effective on energization to complete a circuit energizing said transformer winding, manually operable switch means energizing said further means, and monitoring means connected to the further means and to one of the electrodes and effective on a malfunction contact of an electrode with said further means, rendering said further means ineffective.

2. A pair of spaced electrodes; a voltage transformer energizing said electrodes, having a primary and secondary winding, with the secondary connected to the electrodes; circuit control means including a manually operable switch energizing the primary winding from an alternating voltage source, and electrode electrical short monitoring means connected to the secondary winding and thus to an electrode and to the circuit means and preventing energization of said primary winding from the voltage source on electrical malfunction contact of an electrode and the circuit control means.

3. In an animal stunning apparatus, in combination; a stunning gun having two elongated electrodes of substantially equal length with an end of each electrode for contacting opposite sides of the head of an animal to be stunned; a high voltage device connected across one end of each said electrodes to thus provide a high potential across the other ends of the electrodes which are to be applied to the head of the animal; selective two condition circuit means energizing when in one condition said high voltage device; monitoring means responsive to electrical contact of one of said electrodes and said circuit means when in the other condition; and additional means controlled by the monitoring means rendering the selective two condition circuit means ineffective to assume said one condition.

4. The apparatus of claim 3, and further means responsive to operation of said selective two condition circuit means while in the one condition preventing operation of said monitoring means.

5. The apparatus of 3, and manually operable means for resetting said additional means to render said selective two condition circuit means effective for subsequent operation thereof.

6. The apparatus of 3, having voltage adjusting means in circuit with said device to adjust the voltage across said electrodes.

7. The apparatus of claim 2, wherein said manually operable switch energizes an animal restraining device prior to energizing said primary winding, said restraining device remaining energized during energization of said primary winding.

8. In electrical stunning apparatus for animals, a pair of spaced electrodes; a voltage transformer energizing said electrodes, having a primary and secondary winding, with the secondary connected to the electrodes; circuit means including a manually operable switch energizing the primary winding from an alternating voltage source; a load device such as an animal restraint for an animal to be stunned; and means energizing said load device to restrain said animal prior to said primary winding and maintaining it energized with said primary.

9. In a stunning apparatus for animals, a stunning gun having two spaced electrodes engageable with opposite sides of the head of an animal; means including a high voltage supply connected across said electrodes energizing said electrodes to provide, upon contact of the electrodes with opposite sides of the head of an animal a stunning path; operable two position circuit means including a manually controlled switch energizing the high voltage supply when in one position; and monitoring means having one side connected to said stunning path through the other circuit means position preventing effective operation of said circuit means to the said one position on electrical contact of one of said electrodes and the other side of said monitoring means.

10. The apparatus of claim 8, and means for varying the voltage across said electrodes while said secondary winding is energized.

11. The apparatus of claim 8, and means effective on electrical connection of an electrode with said circuit means, due to malfunction while said switch is unenergized, preventing energization of said electrodes by subsequent operation of said manually operable switch.

References Cited in the file of this patent

UNITED STATES PATENTS

| 1,902,901 | Tefft | Mar. 28, 1933 |
| 2,002,755 | Regensburger | May 28, 1935 |
| 2,879,539 | Cervin | Mar. 31, 1959 |
| 2,976,462 | Miller | Mar. 21, 1961 |
| 2,977,627 | Morse et al. | Apr. 4, 1961 |
| 3,055,046 | Hlavacek et al. | Sept. 25, 1962 |

FOREIGN PATENTS

| 427,055 | Great Britain | Apr. 15, 1935 |
| 358,748 | Italy | Apr. 28, 1938 |